United States Patent [19]
Suzuki et al.

[11] Patent Number: 5,796,041
[45] Date of Patent: Aug. 18, 1998

[54] WATERPROOF PROTECTIVE COVER

[75] Inventors: Yasuhiro Suzuki; Yukio Ohashi, both of Shizuoka-ken, Japan

[73] Assignee: Yazaki Corporation, Tokyo, Japan

[21] Appl. No.: 653,902

[22] Filed: May 28, 1996

[30] Foreign Application Priority Data

May 29, 1995 [JP] Japan ................................ 7-130355

[51] Int. Cl.$^6$ ................................................ H02G 15/08
[52] U.S. Cl. ................................................ 174/92; 174/93
[58] Field of Search ................................ 174/91, 92, 93

[56] References Cited

U.S. PATENT DOCUMENTS

| | | | |
|---|---|---|---|
| 4,528,420 | 7/1985 | Kish et al. | 174/112 |
| 4,927,984 | 5/1990 | Meislitzer et al. | 174/92 |
| 5,397,859 | 3/1995 | Robertson et al. | 175/92 |
| 5,410,105 | 4/1995 | Tahara et al. | 174/92 |
| 5,569,882 | 10/1996 | Yokoyama et al. | 174/92 |
| 5,606,150 | 2/1997 | Radliff et al. | 174/93 |
| 5,614,697 | 3/1997 | Jego et al. | 174/91 |

FOREIGN PATENT DOCUMENTS

| | | |
|---|---|---|
| 59-119576 | 8/1984 | Japan |
| 7-50188 | 2/1995 | Japan |

*Primary Examiner*—Kristine L. Kincaid
*Assistant Examiner*—Marc D. Machtinger
*Attorney, Agent, or Firm*—Finnegan, Henderson, Farabow, Garrett & Dunner, L.L.P.

[57] ABSTRACT

A waterproof protective cover including an identifying portion which is capable of identifying a predetermined position in a chamber for receiving a connection part of electric wires in an insertion direction. The identifying portion is formed outside a side wall of either upper casing member or lower casing member. By taking advantage of the identifying portion, the connection part of electric wires can be positioned at a predetermined position in a chamber defined by the upper and lower casing members. Moreover, the chamber for receiving the connection part of electric wires has no change in a capacity thereof, so that a filling amount of the sealant is not reduced; therefore, sealing performance can be improved.

5 Claims, 5 Drawing Sheets

WATERPROOF PROTECTIVE COVER

BACKGROUND OF THE INVENTION

The present invention relates to a waterproof protective-cover for protecting a connection part of electric wires in a waterproof manner.

Conventional arts include a protective cover for electric wires, which is disclosed in Japanese Utility Model Publication No. 59-119576.

This protective cover comprises two semi-cylindrical bodies which are pivotally connected to each other by means of hinges so as to be opened and closed. Each of the semi-cylindrical bodies is formed with an outer shell as an outer wall of the protective cover at the outer periphery of an inner wall, and an inner chamber defined inside the inner wall. An elongated clearance is formed between the outer shell and the inner wall Moreover, the protective cover is provided with openings coaxially formed at the opposite ends thereof and with a pair of latching members for engagement of semi-cylindrical bodies on the side which is not connected by the hinges. The inner chamber surrounded with the inner wall is filled with an insulating compound (sealant). Further, the upper surface of the inner wall is coated with a thin sheet in order to prevent the filled insulating compound from drying and hardening.

In the foregoing protective cover, a connection part of electric wires connected to each other is positioned in the inner chamber by a press after the thin sheet is peeled off from the cover. Subsequently, when the semi-cylindrical bodies are put together, the latching members engages with each other, thereby performing an insulative protection for the connection part.

In the case where the connection part of electric wires is positioned in the inner chamber, there occurs a case where the connection part deviates from the substantially center portion of the inner chamber. To avoid such a disadvantage, the protective cover is provided with positioning hemispheric rib for arranging the connection part in the substantially center portion of the inner chamber.

However, since the inner chamber is previously filled with the sealant, the hemispheric rib in the inner chamber is buried in the sealant and disappears. For this reason, the connection part is not positioned in the substantially center of the inner chamber.

To avoid the disadvantage described above, there is a proposal to form the hemispheric rib into a large-size rib such that it is not buried in the sealant. In this case, however, an amount of the sealant to be filled in the chamber is reduced by an amount equivalent to a capacity increased due to the large-sized rib. As a consequence, there has arisen a problem in that a sealing performance of the sealant is lowered.

SUMMARY OF THE INVENTION

To solve the above problem, the present invention has been proposed. An Object of the present invention is to provide a waterproof protective cover which is capable of positioning a connection part of electric wire at a predetermined position of a chamber defined by upper and lower casing members of the waterproof protective cover without lowering sealing performance.

To achieve the above object, the present invention provides a waterproof protective cover comprising upper and lower casing members which are obtained by cutting a box-like casing into two halves along an electric wire insertion direction, and which define a receiving chamber for receiving a connection part of electric wires in the upper and lower casing members when the casing members are put together and for being filled with a soft insulative sealant. the waterproof protective cover including an identifying portion for identifying a receiving position of said connection part of electric wires in an electric wire insertion direction of the receiving chamber. Further, the identifying portion is formed at an outer periphery of a side wall of either upper casing member or lower casing member.

The identifying portion is formed in either upper casing member or lower casing member, so that the connection part of electric wires can be readily positioned at the receiving position in the electric wire insertion direction in the receiving chamber by aligning it with the identifying portion. In this case, the identifying portion is formed at the outer periphery of a side wall of either upper casing member or lower casing member, so that no change occurs in the capacity of the upper casing member or the lower casing member and no change occurs in an amount of sealant filled in the chamber defined by these members.

Further, protrusions are formed in a side wall of one of the upper casing member or the lower casing member. An engagement wall is formed outside a side wall of the other of the upper casing member or the lower casing member. The protrusions engages with the engagement wall, so that the upper and lower casing members can be kept in a state of being put together. The identifying portion is interposed between the side wall of the other and the engagement wall.

As described above, the identifying portion is interposed between the side wall of the other (lower casing member) and the engagement wall, so that there is no change in a capacity of a chamber defined by the upper and lower casing members, that is, a chamber to be filled with a sealant, for receiving the connection part of electric wires.

Furthermore, the identifying portion is formed as a reinforcing rib which is interposed between the side wall of the other (lower casing member) and the engagement wall and fixes these walls.

The identifying portion which fixes the engagement wall and the side wall of the other (lower casing member) function as a positioning mark for receiving the connection part of electric wires in an wire insertion direction.

Moreover, the identifying portion has a color different from other parts.

As described above, the identifying portion has a color different from other parts, so that it is easy to distinguish these parts. This serves to position the connection part of electric wires.

Also, adjacent side walls of the upper and lower casing members are connected by the hinges. The hinges may be formed with the aforesaid identifying portion.

Therefore, according to the present invention, the connection part of electric wires is arranged in the upper or lower casing member while aligning the connection part with the identifying portion. By doing this, the connection part can be positioned on a predetermined position in a chamber for receiving the connection part along a wire insertion direction.

DESCRIPTION OF THE PREFERRED EMBODIMENT

Figure 1:
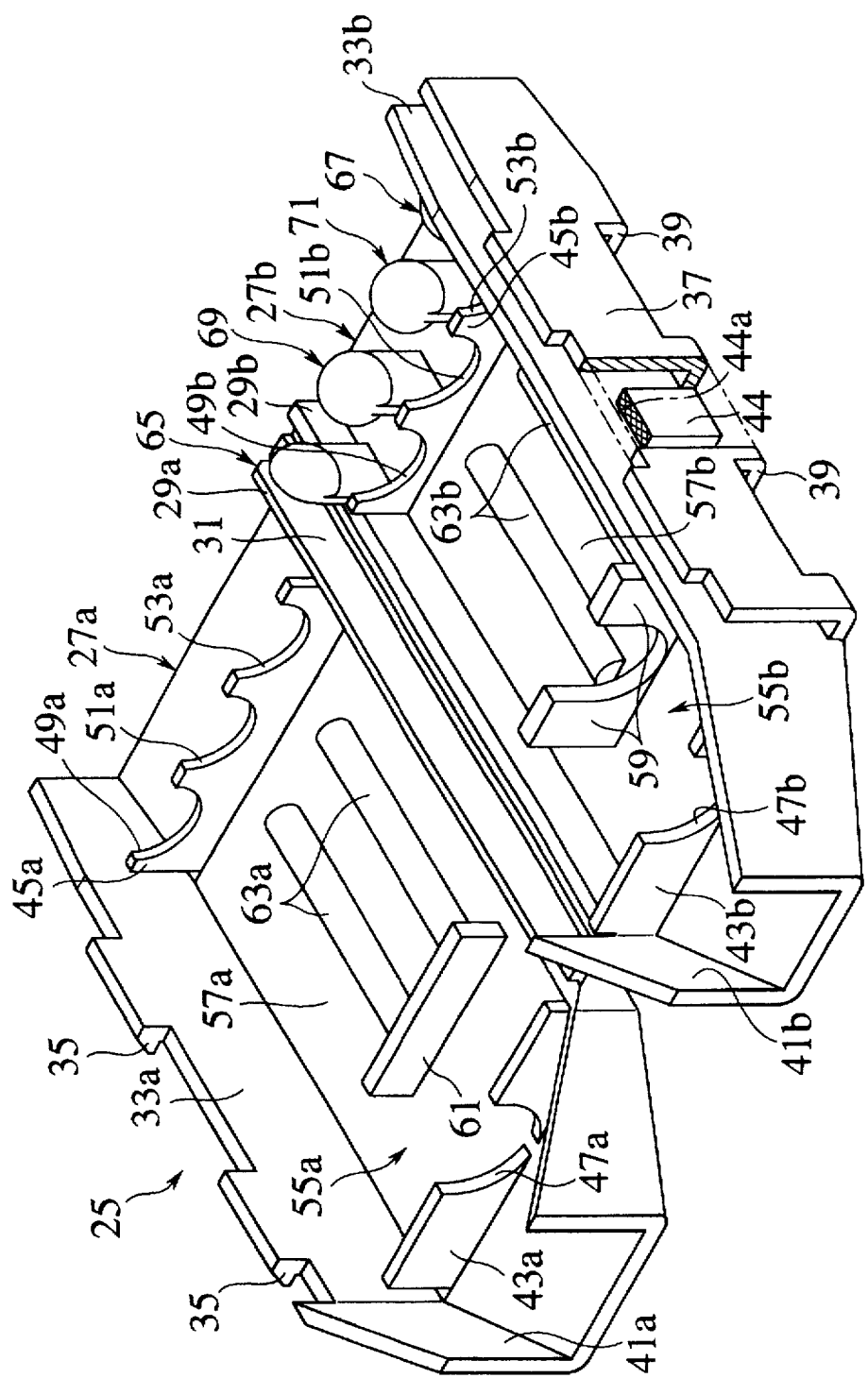
FIG. 1 is a perspective view of a waterproof protective cover according to a first embodiment of the present invention.
Figure 2:
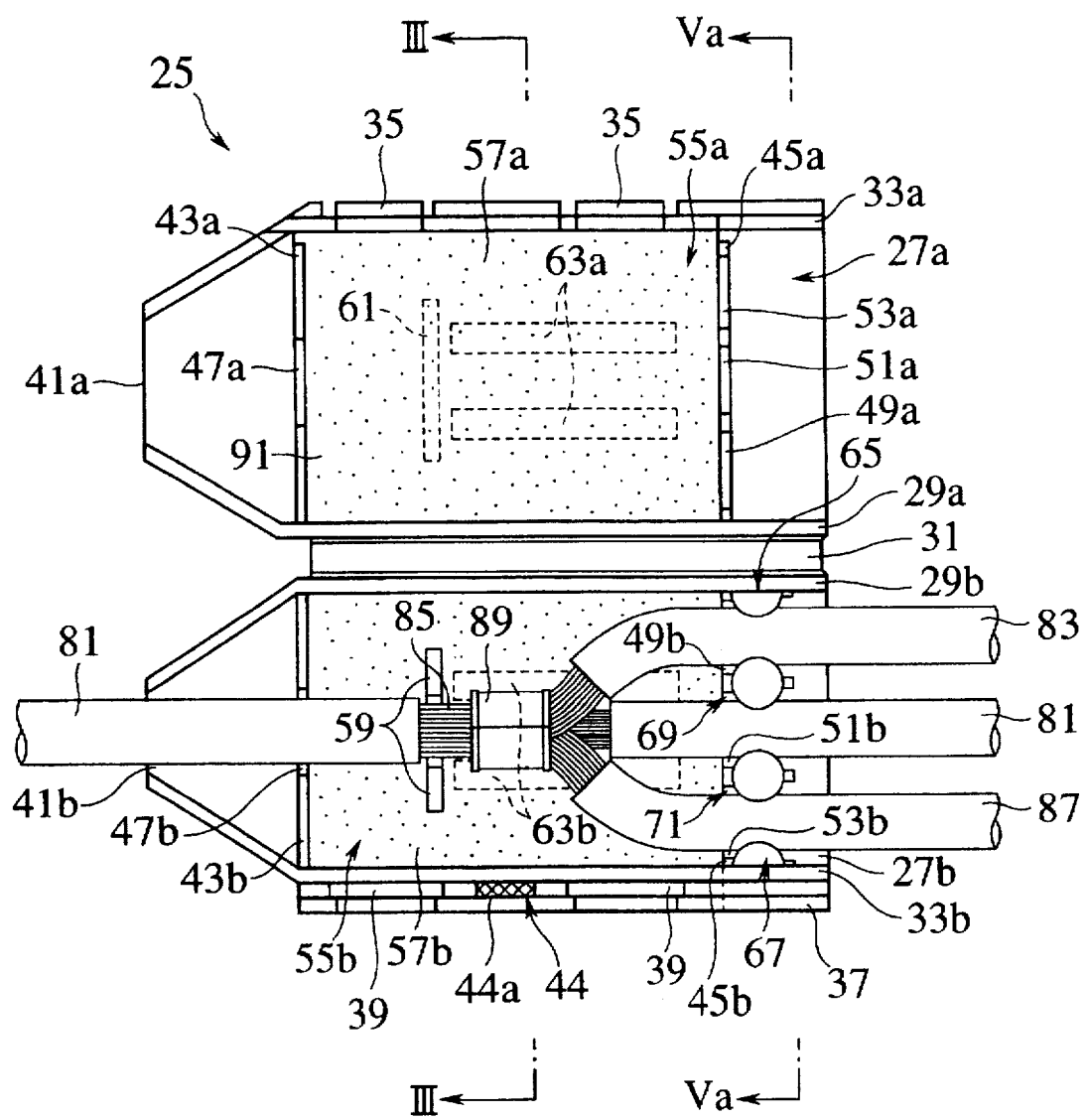
FIG. 2 is a plan view of the waterproof protective cover according to the first embodiment of the present invention.
Figure 3:
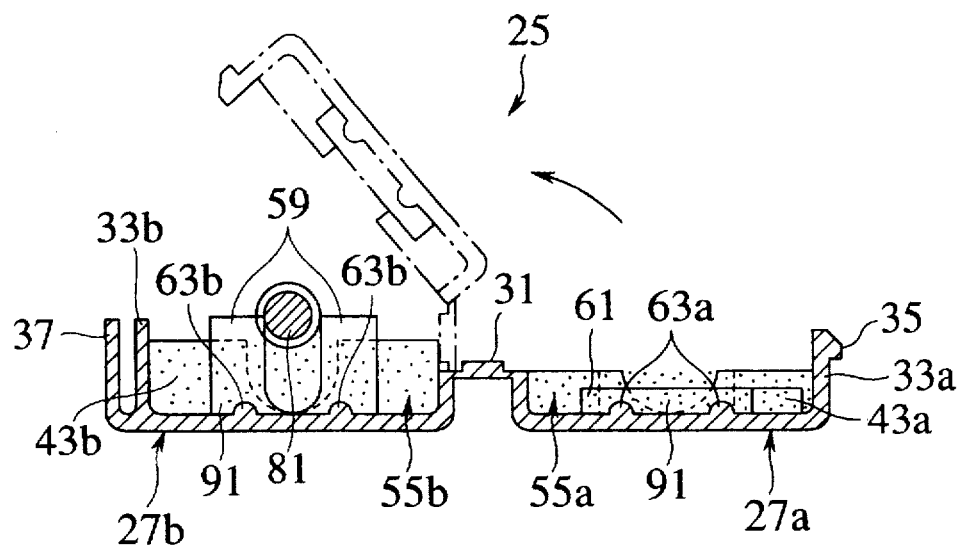
FIG. 3 shows the waterproof protective cover according to the first embodiment of the present invention, and is a cross sectional view cut along the line III—III of FIG. 2.

Embodiments of the present invention will be described below with reference to the accompanied drawings.
FIRST EMBODIMENT FIG. 1 is a perspective view of a waterproof protective cover according to a first embodiment of the present invention, FIG. 2 showing a plan view of the waterproof protective cover, and FIG. 3 showing a cross sectional view thereof cut along the line III—III of FIG. 2.

A waterproof protective cover 25 comprises an upper casing member 27a and a lower casing member 27b which are obtained by cutting a box-like casing molded out of materials such as insulating resin into two halves in a longitudinal direction of the casing. A side wall 29a on the left sides of the casing member 27a and a side wall 29b on the right side of the casing member 27b are pivotably connected by means of hinges 31 in the longitudinal direction of the casing. Thus, these upper and lower casing members 27a and 27b can be put together and opened.

The upper casing member 27a is formed with protrusions 35 and 35 at an outer surface of a side wall 33a thereof on the side where the hinges 31 is not attached. On the other hand, the lower casing member 27b is formed with a flexible engagement wall 37 at an outer surface of a side wall 33b thereof. The flexible engagement wall 37 is formed integrally with the side wall 33b with a predetermined clearance. Also, as shown in FIG. 2, a reinforcing rib 44 is interposed between the outside on the side wall 33b and the engagement wall 37 to fix the side wall 33b and the engagement wall 37. The reinforcing rib 44 serves to firmly fix the engagement wall 37 onto the side wall 33b. Moreover, an upper surface of the reinforcing rib 44 is formed with an identifying portion 44a which is notched. The identifying portion 44a is easily distinguished from other parts in the case where the lower casing member 27b is viewed from a plane. The side wall 33b is formed with engagement holes 39 and 39 at the lower portion thereof.

When these upper and lower casing members 27a and 27b are transferred to a state of being put together, the side wall 33a is fitted into the clearance between the engagement wall 37 and the side wall 33b, and protrusions 35 are fitted into the engagement holes 39 and 39 formed in the lower portion, thereby performing one-touch engagement.

Each of the upper and lower casing members 27a and 27b are formed with openings at the opposite sides thereof in the longitudinal direction. One of openings of each casing member is tapered toward the distal end thereof. The openings are formed as electric wire through holes 41a and 41b.

The upper and lower casing members 27a and 27b are formed with first partition walls 43a and 43b and second partition walls 45a and 45b orthogonal to the longitudinal direction, respectively. These first partition walls 43a and 43b are formed with first openings 47a and 47b, respectively. On the other hand, these second partition walls 45a and 45b are formed with second openings 49a, 49b, 51a, 51b, and 53a, 53b, respectively. These first and second partition walls 43a, 43b and 45a, 45b define chambers 55a and 55b which receive a connection part of electric wires and are filled with sealant. Further, these first and second partition walls 43a, 43b and 45a, 45b serve as a wall for preventing the sealant from leaking out the chamber. Also, these first openings 47a and 47b and second openings 49a, 49b, 51a, 51b, and 53a, 53b form through holes for passing electric wires 81, 83 and 87 when the upper and lower casing members 27a and 27b are put together.

A pair of positioning ribs 59 and 59 is formed on a bottom wall 57b of the chamber 55b in the vicinity of the first partition wall 43b. On the other hand, a press rib 61 is formed on a bottom wall 57a of the chamber 55a. The press rib 61 is abutted against the pair of positioning ribs 59 and 59 when the upper and lower casing members 27a and 27b are put together. Moreover, the bottom walls 57a and 57b of the chambers 55a and 55b are formed with two pairs of reinforcing ribs 63a and 63b between the press rib 61 and the second partition wall 45a and between the positioning ribs 59 and 59 the second partition wall 45b, respectively. Each of the paired reinforcing ribs 63a and 63b is formed into a ridge shape of a semi-circular section and extends substantially in parallel with the longitudinal direction of the casing members.

On an opening side of the second partition wall 45b, the side walls 29b and 33b are formed with wire-fixing ribs 69 and 67, respectively, and further, spherical wire-fixing ribs 69 and 71 are provided between holes 49b, 51b and 53b. The wire-fixing ribs 65 and 67 are composed of legs 73 and 73 which stand on the bottom wall 57b on the side of each of side walls 29b and 33b, and semi-spherical supports 75 and 75 which are formed on the upper portion of the legs 73 and 73 project toward the inside of the lower casing member 27a and 27b therefrom, respectively. On the other hand, the wire-fixing ribs 69 and 71 are composed of flexible legs (vertical walls) 77 and 77 which stand on the bottom wall 57b between the holes 49b and 51b, and spherical supports 79 and 79 located on the top of each leg 77, respectively. Each of distances between supports 75 and 79, between supports 79 and 79, and between supports 79 and 75 is set smaller than an outer diameter of the electric wire 81. Each of distances between legs 73 and 73, between adjacent legs 77 and 77 is set to be substantially equal to the outer diameter of the electric wire 81.

A height of the first partition wall 45a from the bottom wall 57a is set larger than that of the second partition wall 45b from the bottom wall 57b.

In order to protect a connection part 89 where branching subordinate line (electric wires 83 and 87) are connected with the main line (electric wire 81) by using the waterproof protective cover 25 constructed as described above, first, the upper and lower casing members 27a and 27b are transferred to a state of being opened, and a sealant 91 such as a butyl rubber is filled into each of chambers 55a and 55b. Subsequently, the connection part 89 is received in the chamber 55b of the lower casing member 27b. At this time, one side of the electric wire 81 is placed on the sealant 91 filled above the first partition wall 43b, as shown in FIG. 3. The other side of the wire 81 is inserted into the second hole 51b, and then, a bundle of core lines 85 of the wire 81 is interposed between the pair of positioning ribs 59. Simultaneously, electric wires 83 and 87 are inserted into second holes 49b and 53b, respectively.

Moreover, the connection part 89 is positioned so as to be aligned with the identifying portion 44a on the reinforcing rib 44. At this time, the identifying portion 44a is provided outside the side wall 33b, so that it is not hidden by the sealant 91; therefore, the connection part 89 of the electric wire 81 can be securely positioned on a predetermined position.

In the case of inserting the other side of the electric wire 81 into the second hole 51b, when the wire 81 is pressed and interposed between the supports 79, flexible legs 77 and 77 are deflected toward right and left; as a consequence, a distance between the adjacent supports 79 is expanded. After the electric wire 81 is wholly inserted into the second hole 51b, the legs 77 individually return to the original state so as to prevent the electric wire 81 from going through the second hole part 51. In the case of inserting the electric wire 83 into the second hole 49b, the leg 77 of the wire-fixing rib 69 is deflected toward the left-hand side; as a consequence, a distance between the supports 75 and 79 is expanded. After the electric wire 87 is wholly inserted into the second hole 53b, the leg 77 returns to the original state so as to prevent the electric wire 83 from going through the second hole part 51. Likewise, in the case of inserting the electric wire 87 into the second hole 53b, the leg 77 of the wire-fixing rib 69 is deflected toward the left-hand side; as a consequence, a distance between the supports 75 and 79 is expanded. After the electric wire 83 is wholly inserted into the second hole 53b, the leg 77 returns to the original state so as to prevent the electric wire 87 from going through the second hole part 53b.

Figure 5A:
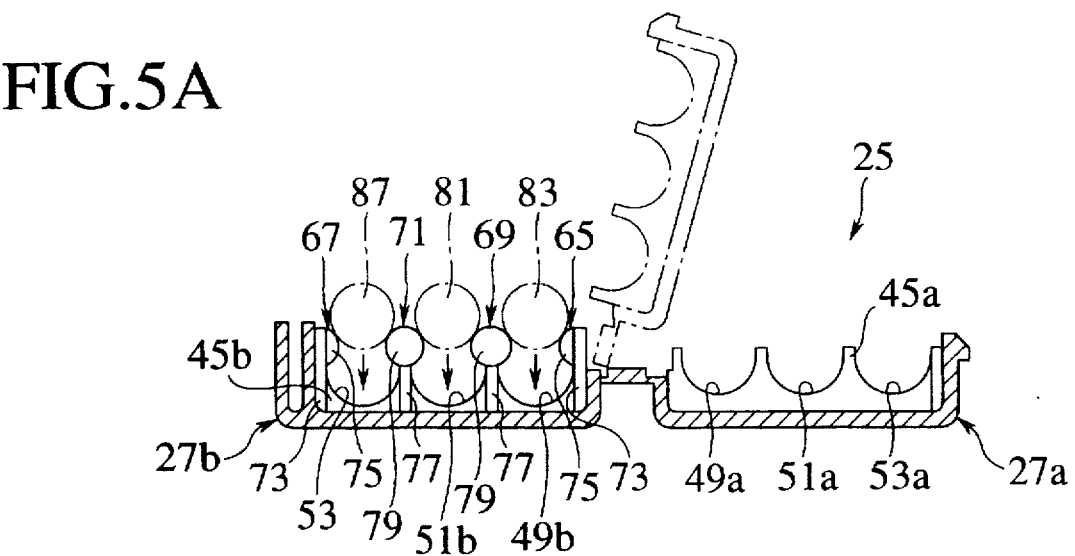
FIG. 5A shows a state before electric wires is received in the lower casing member, and is a cross sectional view cut along the line Va—Va of FIG. 2.
Figure 5B:
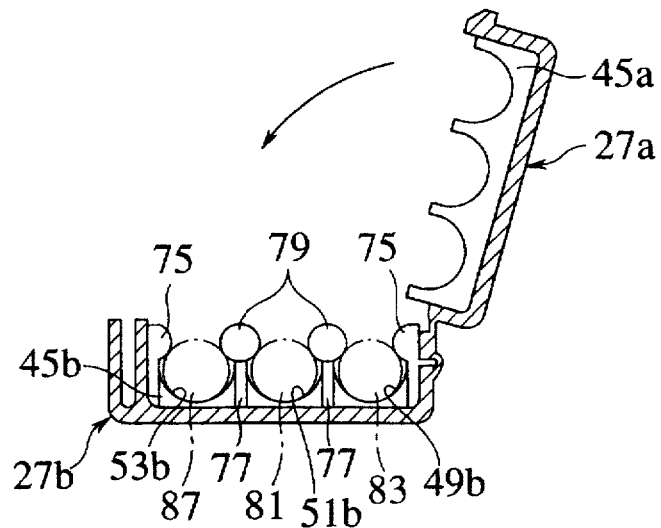
FIG. 5B is a cross sectional view showing a state that the electric wires is received in the lower casing member.
Figure 5C:
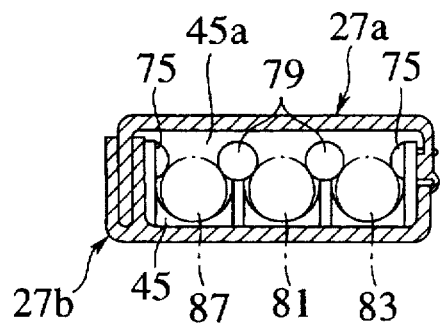
FIG. 5C is a cross sectional view showing a state that the upper portion of the lower casing member receiving the electric wire is covered with the upper casing member.

In this manner, the upper and lower casing members 27a and 27b are previously filled with the sealant 91 such as a butyl rubber, and the connection part 89 where branching subordinate line (electric wires 83 and 87) are connected with the main line (electric wire 81) is received in the lower casing member 27b. Thereafter, the upper portion of the lower casing member 27b is covered with the upper casing member 27a by pivoting the casing member 27a. By doing this, the first partition wall 43a of the upper casing member 27a abuts against the partition wall 43b of the lower casing member, so that a through hole for passing the electric wire is defined by the first hole elements 47a and 47b. Further, the press rib 61 is abutted against the upper portions of the pair of positioning ribs 59, so that the core line 85 is positioned between the pair of positioning ribs 59. Furthermore, the second partition wall 45a of the upper case member 27a abuts against the upper portion of the second partition wall 45b of the lower casing member 27b, so that through holes for passing the wires are defined by second hole elements 49a, 49b, 51a, 51b, 53a and 53b. Thus, as shown in FIGS. 5B and 5C, the electric wires 81, 83 and 87 are prevented from floating up from the second hole parts 49b, 51b and 53b.

According to the present invention, the connection part 89 is readily positioned by aligning it with the identifying portion 44a, so that the connection part 89 can be securely arranged at a predetermined position. Moreover, the identifying portion 44a is provided outside the side wall 33b of the lower casing member 27b; therefore, the identifying portion 44a is not hidden even though the chamber 55b for receiving the connection part is filled with the sealant 91. This serves to securely perform positioning of the connection part. In addition, the identifying portion 44a is provided outside the side wall 33b of the lower casing member 27b; therefore, the capacity of the chamber for receiving the connection part 89 is not decreased. Thus, an amount of the sealant 91 to be filled in the chamber is not decreased. This serves to improve sealing performance.

Moreover, according to the present invention, the identifying portion 44a is provided on the upper surface of the reinforcing rib 44 for reinforcing the engagement wall 37 with respect to the side wall 33b, so that there is no need of newly providing an identifying portion in the upper and lower casing members 27a and 27b. Thus, this serves to reduce molding cost of casing members.

In addition, electric wires 81, 83 and 87 are individually fixed by means of the wire-fixing ribs 65, 67, 69 and 71, so that these electric wires have no disadvantages such as lifting and movement when being set in the upper and lower casing members 27a and 27b. Therefore, workability can be improved.

The spherical wire-fixing supports 79 are provided, so that electric wires are easy to be inserted into each of holes defined by second hole elements 49a and 49b, 51a and 51b, and 53a and 53b, and are readily removable therefrom. Moreover, the spherical wire-fixing supports 79 securely hold the electric wires regardless of a thickness of an electric wire.

Figure 4:
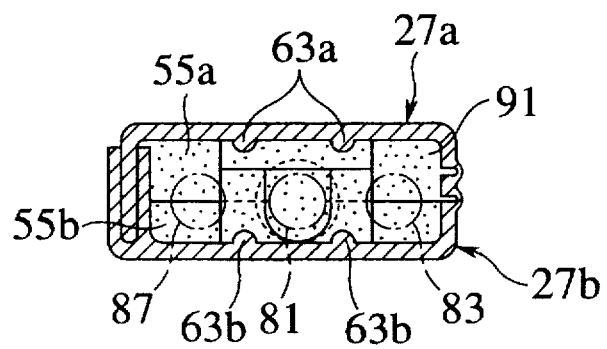
FIG. 4 shows the waterproof protective cover according to the first embodiment of the present invention, and is a cross sectional view of a state that an upper portion of a lower casing member is covered with an upper casing member.

According to the present invention, as shown in FIG. 4, reinforcing ribs 63a and 63b project in a shape of a semicircle between electric wires 81 and 87 and between electric wires 81 and 83. Thus, these reinforcing ribs serves to suitably fill the sealant 91 between the electric wires 81, 83 and 87 to surely perform insulative protection. Specifically, these reinforcing ribs 63a and 63b individually have a shape of a semicircle, so that the sealant 91 can be radially poured between wires. Therefore, the sealant 91 is filled between electric wires 81 and 83 and between 81 and 87 so as to expand a span between these wires 81, 83 and 87.

Further, reinforcing ribs 63a and 63b are provided on the bottom wall 57a and 57b of the upper and lower casing members 27a and 27b, respectively. By doing this, strength of these casing members 27a and 27b can be improved.

Furthermore, reinforcing ribs 63a and 63b project toward the chamber 55a and 55b, so that the capacity of these chamber 55a and 55b decreases by a capacity of the reinforcing ribs 63a and 63b. Therefore, an amount of the sealant 91 to be filled into the chamber is reduced. This serves to perform a reduction in the weight of protective cover.

Figure 6:
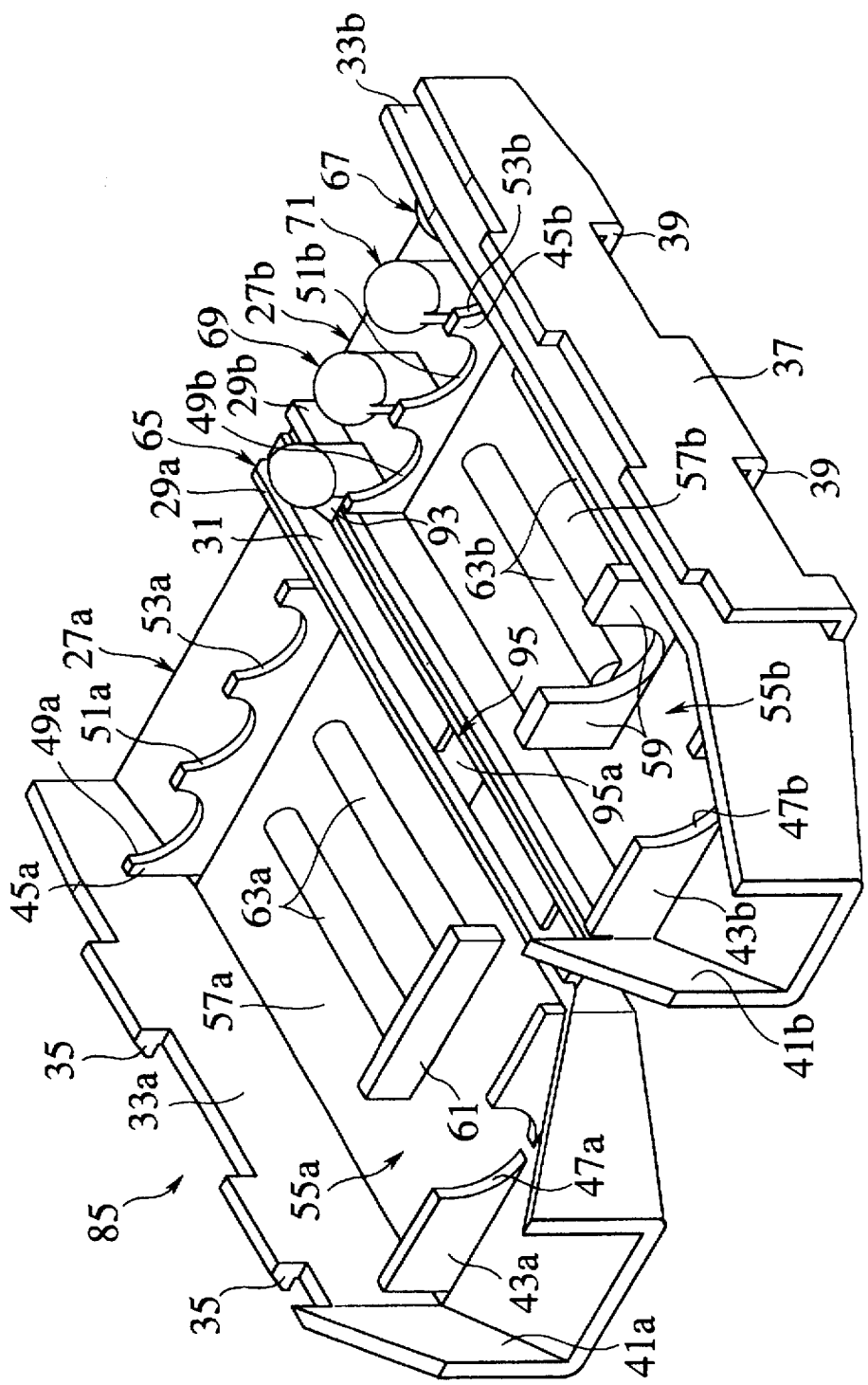
FIG. 6 a perspective view of a waterproof protective cover according to a second embodiment of the present invention.

The following is the description on another embodiment of the waterproof protective cover according to the present invention. In FIG. 6, to simplify illustration, like reference numerals is used to designate components same with those used in the foregoing first embodiment.

SECOND EMBODIMENT

A waterproof protective cover 85 according to the second embodiment will be described below with reference to FIG. 6. The waterproof protective cover 85 of this embodiment is provided with an identifying portion 95a on the hinges 31 connecting the side wall 29a of the upper casing member 27a with the side wall 29b of the lower casing member 27b.

More specifically, the hinges 31 are formed with an opening 95 arranged so as to be in line with a predetermined position in the chamber 55b for receiving the connection part 89 of electric wires at the substantially midway in the wire insertion direction. The opening 95 serves as the identifying portion 95a.

In the case of arranging the connection part 89 of the electric wires in the chamber 55b, the connection part 89 is positioned on a place in line with the identifying portion 95b. By doing this, the connection part 89 can be located on a predetermined position in the wire insertion direction.

According to this embodiment, the connection part 89 of the electric wires is readily positioned by aligning the connection part 89 with the identifying portion 95a; therefore, the connection part 89 can be located on a predetermined position. Moreover, the identifying portion 95a is formed in the hinges 31, so that it not buried even though the sealant 91 is filled into the chamber 55b. Therefore, positioning of the connection part 89 can be securely performed. In addition, the identifying portion 95a is formed in the hinges 31, so that the capacity of the chamber does not decrease. Thus, an amount of the sealant 91 to be filled into the chamber is reduced, so that sealing performance can be improved.

According to this embodiment, the identifying portion 95a is formed in the hinges 31, so that there is no need of newly an identifying portion. Thus, molding cost of casing members can be reduced.

In the aforesaid embodiments, identifying portions 44a and 95a individually have a shape different from other parts, so that they can function as a positioning mark. These identifying portions 44a and 95a may be formed with a color different from other parts to function as a positioning mark. By doing this, these identifying portions can be further effectively function as a positioning mark.

What is claimed is:

1. A waterproof protective cover for a connection portion of an electric wire comprising:

an upper casing member and a lower casing member, each of said casing members having a pair of side walls aligning with a direction of travel of the electric wire, cooperable to define a chamber, said chamber including a receiving position for receiving the connection portion of the electric wire, said receiving position being provided at a preselected position in the chamber along the direction of travel of the electric wire, one of said side walls of said lower member including an inner side wall and an outer side wall spaced from said inner wall; and a reinforcing rib provided on said inner side wall, an upper portion of said reinforcing rib defining a receiving position location marker for identifying said receiving position of the connection portion of the electric wire, said receiving position location marker being aligned with the preselected position of the receiving position on a line generally perpendicular to the direction of travel of the electric wire.

2. The waterproof protective cover according to claim 1, wherein said receiving position location marker has a color different from a color of other parts of the cover.

3. The waterproof protective cover according to claim 1, wherein said chamber is filled with an insulative sealant where the receiving position receives the connection portion of the electric wire.

4. The waterproof protective cover according to claim 1, wherein protrusions project from at one of said side walls of the upper casing member, and said outer side wall of said lower casing member defines an engagement wall having notches to engage said protrusions.

5. A waterproof protective cover for a connection portion of an electric wire comprising:

an upper casing member and a lower casing member, each casing member having a pair of side walls aligning with a direction of travel of the electric wire, cooperable to define a chamber, said chamber including a receiving position for receiving a connection portion of the electric wire, said receiving position being provided at a preselected position in the chamber along the direction of travel of the electric wire; and a hinge pivotably connecting said upper casing member and said lower casing member between two adjoining ones of said side walls, said hinge including a gap, said gap defining a receiving position location marker for identifying said receiving position of the connection portion of the electric wire, said gap being aligned with the preselected position of the receiving position on a line generally perpendicular to the direction of travel of the electric wire.

* * * * *